(12) United States Patent
Aplin (10) Patent No.: US 10,899,282 B2
(45) Date of Patent: Jan. 26, 2021

(54) VEHICLE CONTAINER MOUNTING ARRANGEMENTS, PARTICULARLY FOR EXTERIOR KITCHENS OF RVS

(71) Applicant: Michael Edwin Aplin, Elkhart, IN (US)

(72) Inventor: Michael Edwin Aplin, Elkhart, IN (US)

( * ) Notice: Subject to any disclaimer, the term of this patent is extended or adjusted under 35 U.S.C. 154(b) by 144 days.

(21) Appl. No.: 16/350,806

(22) Filed: Jan. 14, 2019

(65) Prior Publication Data

US 2020/0223372 A1 Jul. 16, 2020

(51) Int. Cl.
*B60R 9/06* (2006.01)
*B60R 11/06* (2006.01)
*B60P 3/36* (2006.01)
*B60P 3/34* (2006.01)
*B60R 11/00* (2006.01)

(52) U.S. Cl.
CPC ............... *B60R 9/06* (2013.01); *B60P 3/34* (2013.01); *B60P 3/36* (2013.01); *B60R 11/06* (2013.01); *B60R 2011/004* (2013.01); *B60R 2011/0052* (2013.01); *B60R 2011/0085* (2013.01)

(58) Field of Classification Search
CPC ... B60R 9/06; B60R 11/06; B60R 2011/0085; B60R 2011/004; B60R 2011/0052; B60R 9/065; B60R 11/00; B60P 3/36; B60P 3/34
USPC ....................................................... 296/26.9
See application file for complete search history.

(56) References Cited

U.S. PATENT DOCUMENTS

| 5,263,467 | A  | * | 11/1993 | Jones ................... | A47J 37/0713 |
|---|---|---|---|---|---|
| | | | | | 126/37 B |
| 6,015,177 | A  | * | 1/2000 | Tijerina .................. | B60P 1/36 |
| | | | | | 224/281 |
| 6,637,426 | B2 | * | 10/2003 | Champlin ........... | A47J 37/0786 |
| | | | | | 126/276 |
| 8,776,778 | B1 | * | 7/2014 | Brown ................... | B60R 11/00 |
| | | | | | 126/276 |

* cited by examiner

*Primary Examiner* — Pinel E Romain
(74) *Attorney, Agent, or Firm* — Ryan M. Fountain (57) ABSTRACT

A containment arrangement is provided having a container with vehicle connection structure which allows an opening in the container to move through a variety of different planes without limiting accessibility to the opening. In addition, the present invention includes means for attaching a container to the vehicle at a corner of the vehicle, and allowing a vertical opening in the container to be fully accessible as the container is moved from a location adjacent one side of the vehicle to a location adjacent another side of the vehicle. Preferred embodiments of the invention include a double pivot structure connecting a container, such as an exterior kitchen, to a RV, where the front of the container serves as a kitchen counter when opened, and provides access to a stove and refrigerator. In those preferred embodiments, the exterior kitchen can be selectively locked into a variety of positions, rotated with respect to the corner of the vehicle, and vertically supported on the vehicle side wall and/or the ground, without manual lifting of the container.

7 Claims, 12 Drawing Sheets

VEHICLE CONTAINER MOUNTING ARRANGEMENTS, PARTICULARLY FOR EXTERIOR KITCHENS OF RVS

BACKGROUND OF THE INVENTION

This application claims priority from U.S. Provisional Application Ser. No. 62/245,731, filed on Nov. 13, 2015, entitled Recreational Vehicle with Kitchen Facilities, to the fullest extent permitted by law. Also, this application is a continuation of U.S. patent application Ser. No. 15/330,919, filed on Nov. 14, 2016.

The present invention relates to exterior storage and utility facilities for use with vehicles. More specifically, this invention relates to a containment system for recreational vehicles (such as travel trailers and motorhomes) which can be selectively located for optimal utility on the rear or sides of a vehicle without detachment from the vehicle while repositioning. This containment system is especially suited for holding and securing exterior kitchen applications.

Previously, various arrangement have been suggested for attaching containers or accessories to the exterior of a vehicle. In some arrangements, the item was removable from the vehicle by lifting the item off of a support structure, such as a latch or rail, and then stored within the vehicle or elsewhere. An example of this would be propane bar-b-que grills which are attached to the side of a travel trailer and coupled to a propane source when in use, and then detached from the trailer and the propane source for cleaning and/or storage elsewhere. While certainly useful for outdoor cooking, these items require the user to manually lift and carry the item and to visually align it with a support structure when coupling to the vehicle. Accordingly, such arrangements are of limited application when the item is heavier and/or when sufficient structural support for the item weight and/or size of the item requires more complicated alignment and/or coupling to the vehicle. Also, larger and heavier items require convenient storage locations when not in use.

Previously, larger containers and accessories have been attached to the rear of a vehicle for storage and have been removable for use. Example of this would be tool boxes or coolers mounted directly or indirectly to the hitch of a vehicle. These arrangements have often provided a convenient storage space, but they still require the user to manually lift the item out of or off of the hitch connection. Further, where direct connection is made to the vehicle hitch, the user is also required to align the connection components, often with visual impairment of the connection location, due to the size of the container, often while still manually holding or lifting the container. Indirect connection arrangements to the vehicle hitch often avoid the alignment difficulties, but at the expense of separate and additional structure, expense, and weight. Further, since many vehicle users desire to tow trailers with the hitch, use of the hitch for a container necessarily prevents concurrent towing. In addition, where the vehicle has a tailgate or rear ramp door, mounting a container to the hitch for either storage or use would block operation of the vehicle tailgate or ramp door.

Previously, it has been suggested to mount certain vehicle accessories, such as spare tires, on a swingable arm at the rear of the vehicle. Such arms are, for example, mounted to the side of the rear wall of the vehicle, over and/or under the rear lights, so that the tailgate can be raised and lowered when the arm is swung out of the way. They can also be mounted to the end portion of the vehicle bumper without attachment to the vehicle body. However, these arms are typically mounted via a single pivot point, intending a field of motion of 90 to 180 degrees at most. Typically, the pivot axis does not extend away from the vehicle past the plane of the vehicle side, so as to avoid reduction in aerodynamic characteristics of the vehicle and/or to keep overall vehicle width from expanding. Further, in each of these arrangements, the accessory typically needs to be manually lifted from the support structure and carried by the user, in order to be used.

Previously, methods have been proposed for mounting various containers to a vehicle which allow the container to be accessed or used at various locations and orientations with respect to the vehicle by means of pivoting structures connected to a vehicle. However, these structures typically the require the container to be accessed only through its top surface, which is maintained in the same horizontal plane in all locations and orientations of container use. It is often desirable to access a container through one or more sides or its front face, especially where it would be advantageous to have the side or front face fold down to be a usable surface, and/or where the objects stored within the container tend to be heavy or bulky.

Also, previously, various structures have been proposed to allow for exterior kitchens and/or entertainment systems in recreational vehicles ("RVs"). Such kitchens can include sinks, stoves, refrigerators, and/or counter space for food preparation. Such entertainment systems can include televisions, video recording and playback devices, and various stereo music components. In certain instances, a slide-out box has been used having a self-contained kitchen or entertainment system which is accessible from the exterior of the recreational vehicle when the box is opened and/or extended from the vehicle. However, when the exterior kitchen or entertainment system is not being used, the slide-out box is, for example, retracted into the vehicle (to keep the appliances therein secure) and takes up floor space within the vehicle. Moreover, slide-out mechanisms tend to be expensive and require greater maintenance and installation work. In other instances, the kitchen or entertainment system is disposed in a compartment formed in the sidewall of the recreational vehicle, accessible through an exterior door or hatch. These are often less costly than a slide-out box arrangement, but still take up floor space in the recreational vehicle, both when being used and when not being used.

In each case, the floor space used by prior exterior kitchen or entertainment systems require careful planning and orientation with respect to the rest of the structure and function of the vehicle features. It is especially difficult, for example, to place such kitchen or entertainment system compartments at the rear of "toy hauler" types of travel trailers, due to "garage" width requirements. Moreover, unless the recreational vehicle was designed for the exterior kitchen or entertainment system at the outset, it is especially difficult to retrofit an exterior kitchen or entertainment system to pre-existing recreational vehicles using these prior arrangements.

In addition, recreational vehicles are typically used in a wide variety of applications with differing spacial and orientation constraints. For example, in a given campground, the vehicle may need to park with a significantly sloping surface on the side of the vehicle or with trees in close proximity to the vehicle side, making use of an exterior kitchen on that side undesirable. In those situations, the rear of the vehicle may be preferable for the exterior kitchen location, since presumably the vehicle was driven over a sufficiently level surface to come to that location. In other situations, inclement weather may make location of the exterior kitchen on the side of the vehicle, under an awning covering the vehicle door, more desirable than in an exposed rear location. Also, since bar-b-que grills are often used in connection with recreational vehicles, it is desirable to have exterior kitchens capable of a wide variety of facing orientations, in order to facilitate the cooking process in conjunction with grill use. Further, it is sometimes advantageous to allow exterior cooking components to be fully removable from the recreational vehicle, for use at a location more remote from the recreational vehicle and/or to facilitate cleaning and maintenance. Thus, an ideal exterior kitchen arrangement would be able to accommodate such changes in location. However, the prior slide-out and compartment formed arrangements typically allow only a single, fixed location of use.

Similar disadvantages and concerns arise when attempting to use other equipment and supply containment systems for recreational vehicles, such as tool boxes and specialty equipment storage and use. Accordingly, it is an object of the present invention to provide improved arrangements for exterior storage and use of containment systems for vehicles. More specifically, objectives of the present invention include providing exterior mounting of containers to vehicles which is:

a. less costly to manufacture, install, and/or to maintain,
 b. more versatile in mounting location and available range of use locations,
 c. readily adapted for use with RV exterior kitchens,
 d. readily shifted for use at the rear and the side of a vehicle, without manual lifting,
 e. capable of supporting significant loads for extended periods of time,
 f. not an encumbrance to vehicle floor space, and
 g. readily retrofitable to existing vehicles.

SUMMARY OF THE INVENTION

These and other objects of the present invention are obtained through the provision of a containment arrangement having a container with vehicle connection structure which allows an opening in the container to move through a variety of different planes without limiting accessibility to the opening. In addition, the present invention includes means for attaching a container to the vehicle at a corner of the vehicle, and allowing a vertical opening in the container to be fully accessible as the container is moved from a location adjacent one side of the vehicle to a location adjacent another side of the vehicle. Preferred embodiments of the invention include a double pivot structure connecting a container, such as an exterior kitchen, to a RV, where the front of the container serves as a kitchen counter when opened, and provides access to a stove and refrigerator. In those preferred embodiments, the exterior kitchen can be selectively locked into a variety of positions, rotated with respect to the corner of the vehicle, and vertically supported on the vehicle side wall and/or the ground, without manual lifting of the container.

Other objects, advantages and novel features of the present invention will become readily apparent upon review of the following detailed description and drawings.

BRIEF DESCRIPTION OF THE DRAWINGS

FIGS. 19(*a-f*) are top schematic views showing the range of orientations of a container of the present invention with respect to the rear right corner of an RV, as permitted by its mounting system of FIGS. 1 and 15.

FIGS. 20(*a-c*) are top plan schematic views showing the range of orientations of a container of the present invention using an alternative mounting system.

DETAILED DESCRIPTION OF PREFERRED EMBODIMENTS

Several different embodiments of the present invention are illustrated in the drawings. In general, FIGS. 1-14 illustrate one embodiment, FIGS. 15-18 illustrate another embodiment, and FIGS. 20(*a-c*) illustrate yet another embodiment. FIGS. 19(*a-f*) illustrate ranges of orientation for generic embodiments of the present invention, including these three representative embodiments. The numbering in the figures is consistent across corresponding components in each of the embodiments.

Figure 1:
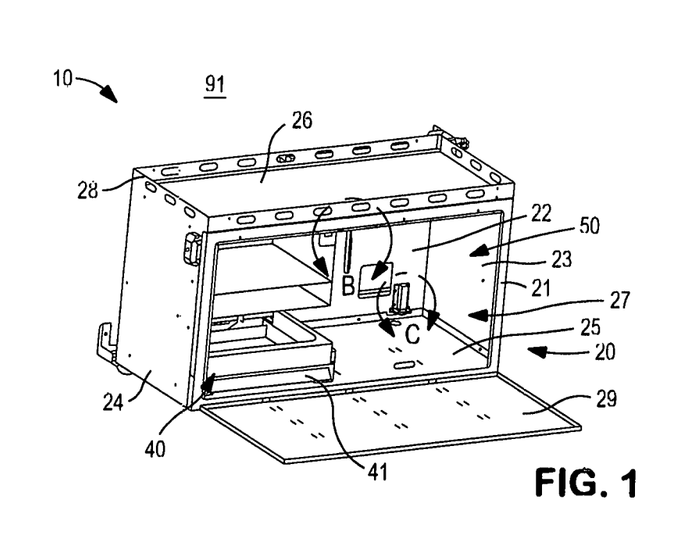
FIG. 1 is a front, left, upper perspective view of kitchen facilities for a recreational vehicle according to one embodiment of the present invention, with the appliances, such as a cooking unit (or stove) and refrigerator removed and with the container (or storage unit) for the kitchen facilities fully connected to its mounting structure.
Figure 1B:
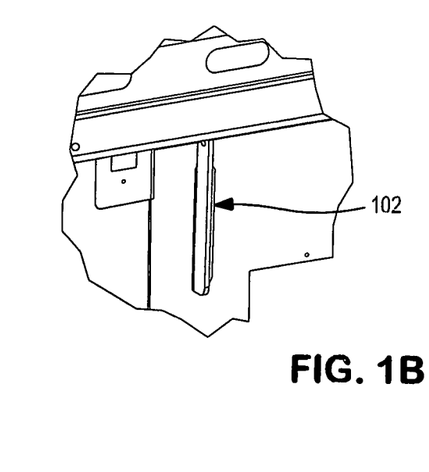
FIG. 1B is an enlarged perspective view of the detail shown in area B of FIG. 1.
Figure 1C:
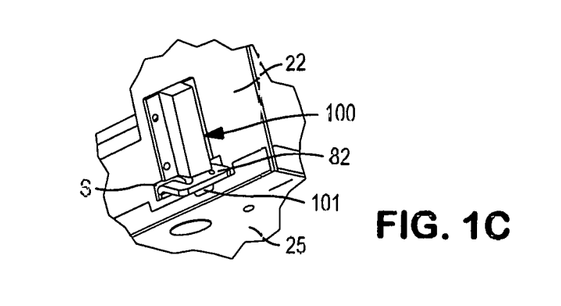
FIG. 1C is an enlarged perspective view of the detail shown in area C of FIG. 1.
Figures 2, 2A:
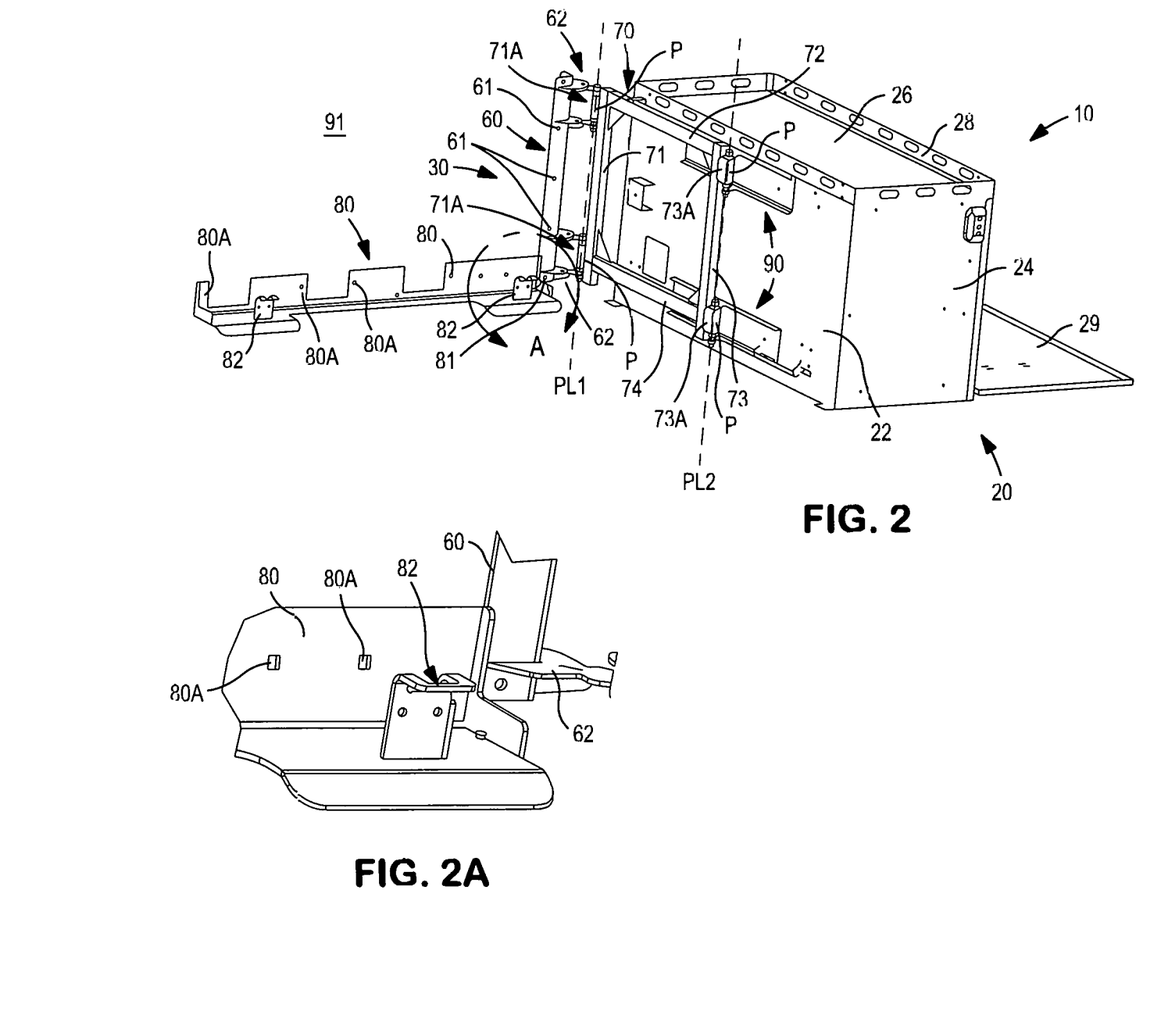
FIG. 2 is a front, left, upper perspective view of the kitchen facilities of FIG. 1 with the container for the kitchen facilities partially released from it mounting structure and rotated toward a side wall of the RV, illustrating the rear of the kitchen facilities and its mounting structure.
FIG. 2A is an enlarged perspective view of the detail shown in area A of FIG. 2.
Figure 3:
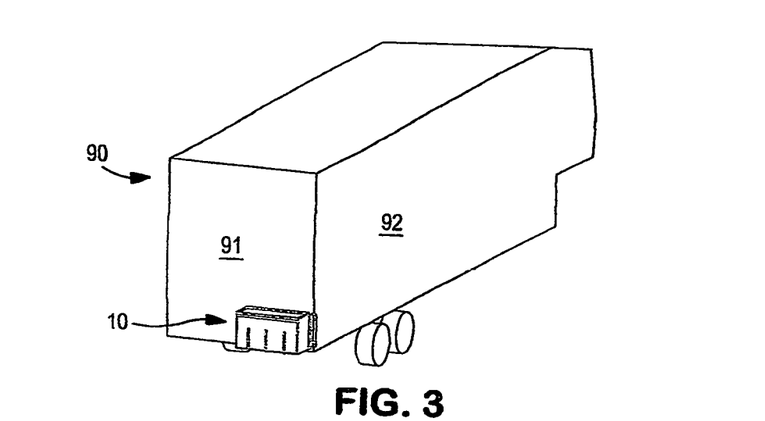
FIGS. 3-14 illustrate the kitchen facilities of FIG. 1, as secured to a recreational vehicle, and further illustrate the range of motion of storage unit 20.
Figure 4:
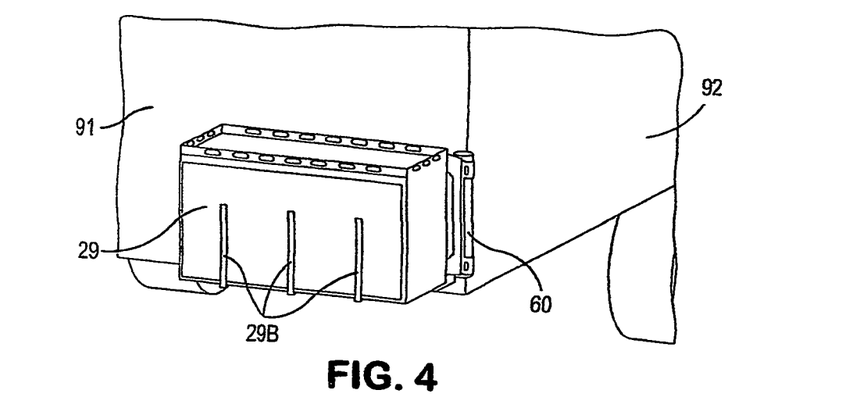
Figure 5:
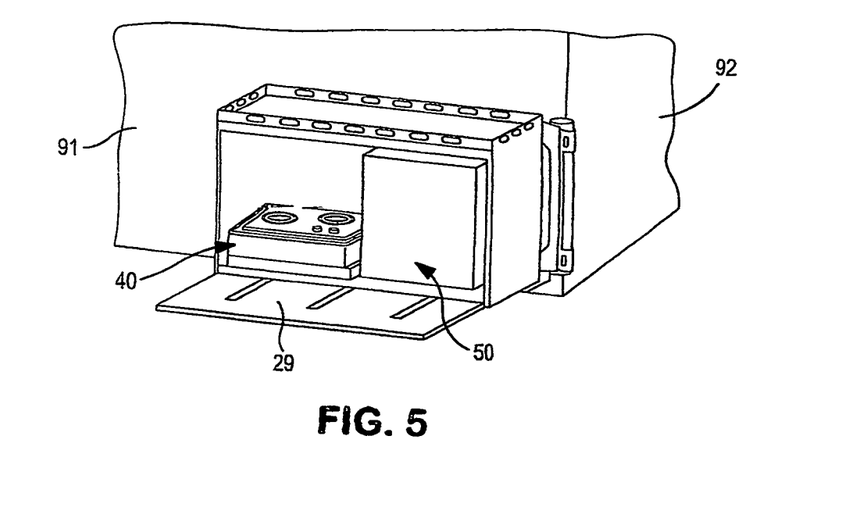

Referring to FIGS. 1 and 2, a kitchen facility 10 for a recreational vehicle generally includes a storage unit 20 (or container) and a mounting structure 30. In the embodiment shown, storage unit 20 generally includes a first or front side 21, a second or rear side 22, a third side (or right side) 23, a fourth side (or left side) 24, a bottom 25 and a top 26 defining an interior space 27. First side 21, second side 22, third side 23, and fourth side 24 are, for example, formed so as to extend above top 26 and form a wall 28 thereabout. A door 29 is secured, for example, to bottom 25 by one ore more hinges (not shown), of a conventional construction. In this manner, door 29 may be selectively pivoted up or down to close or permit access to interior space 27. Although not shown in the present embodiment, kitchen facilities 10 may be provided with a locking or latching mechanism to secure door 29 in a close position. Also, storage unit 20 may, for example, be provided with collapsible braces or legs of convention construction, which selectively extend from bottom 25 to the ground upon which the recreational vehicle rests, in order to provide additional support for the storage unit when it is positioned away from the rear wall 91 of the recreational vehicle. Similarly, door 29 may be formed with conventional stops to limit its downward motion to a horizontal plane when opened.

Figure 6:
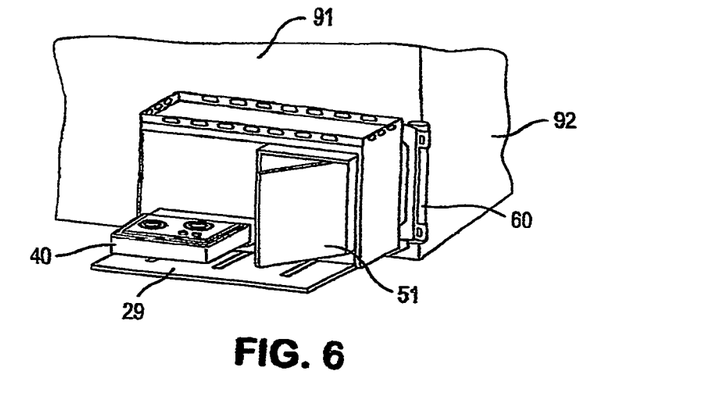
Figure 7:
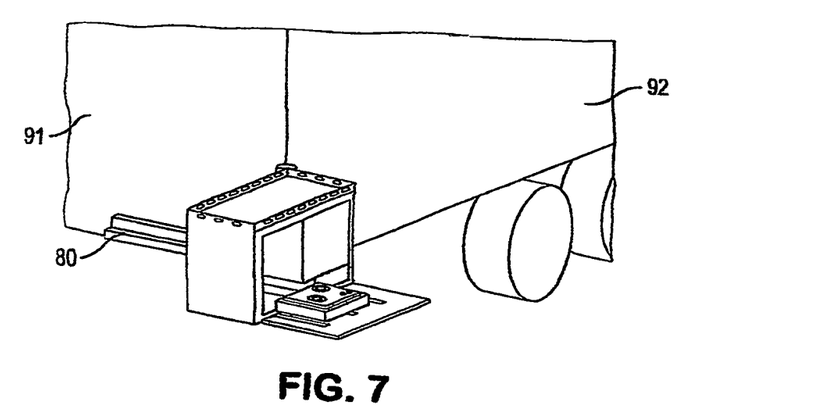
Figure 8:
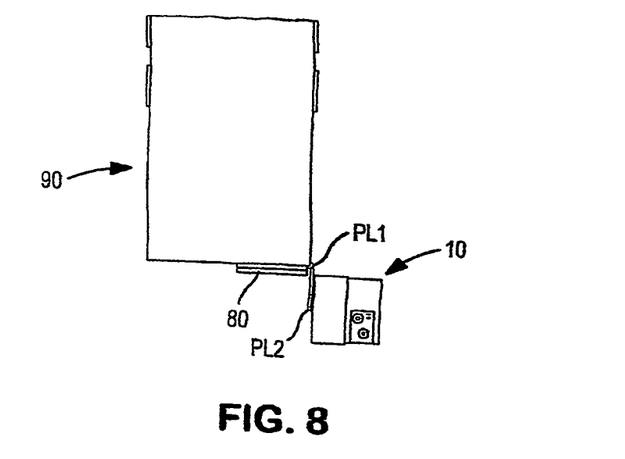
Figure 9:
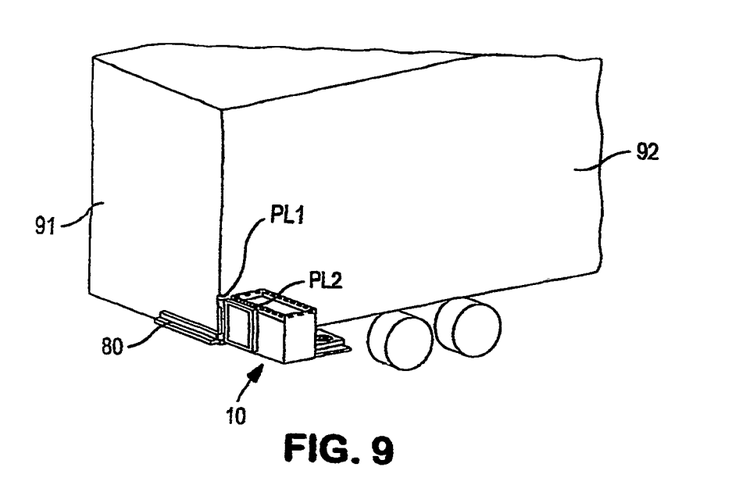
Figure 10:
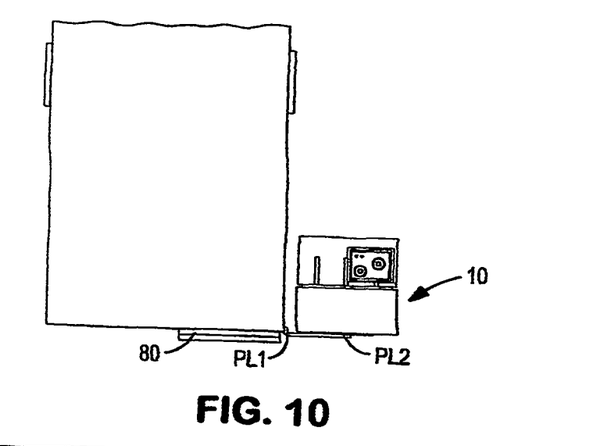
Figure 11:
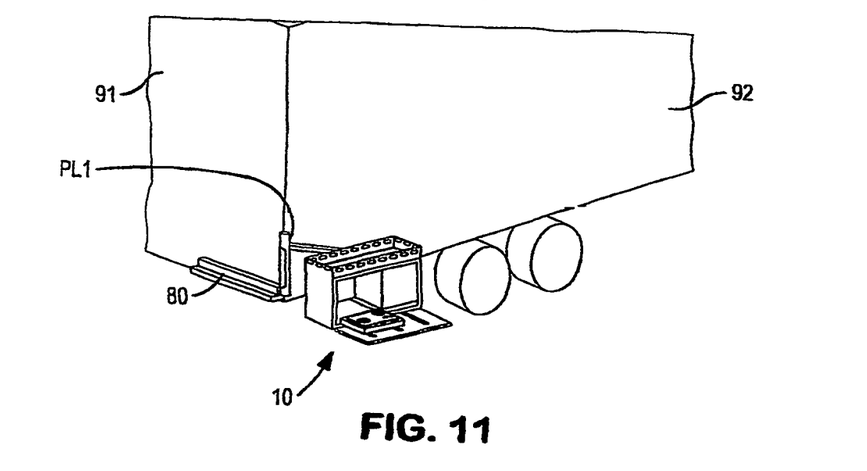
Figure 12:
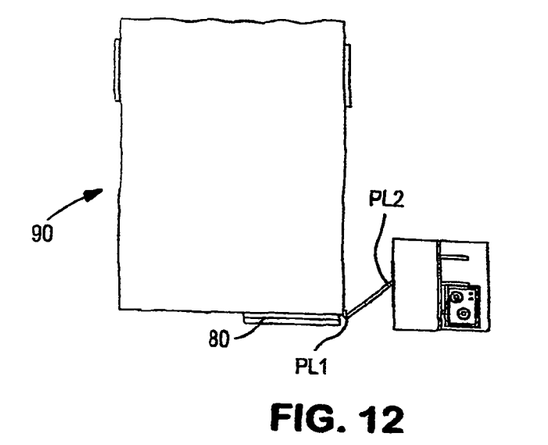
Figure 13:
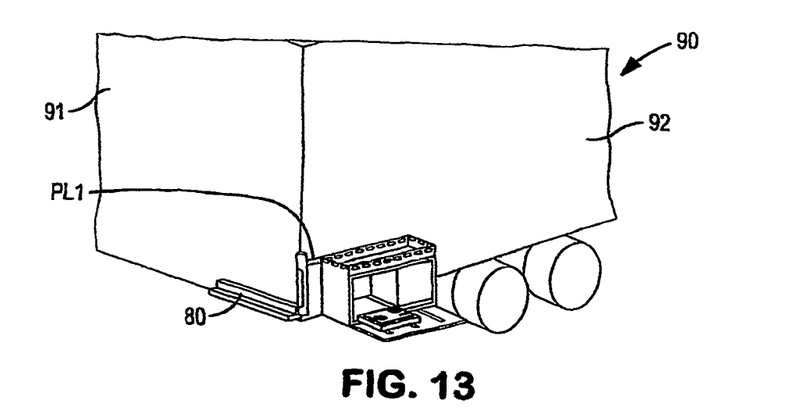
Figure 14:
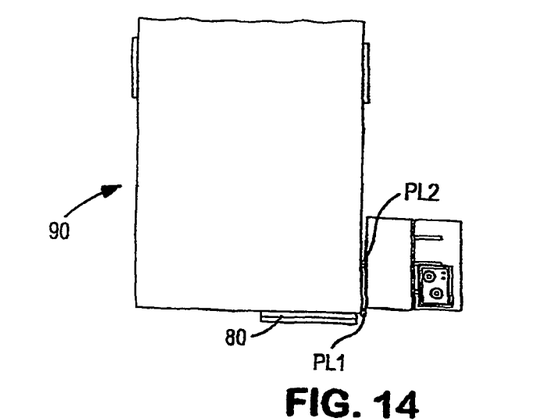
Figure 15:
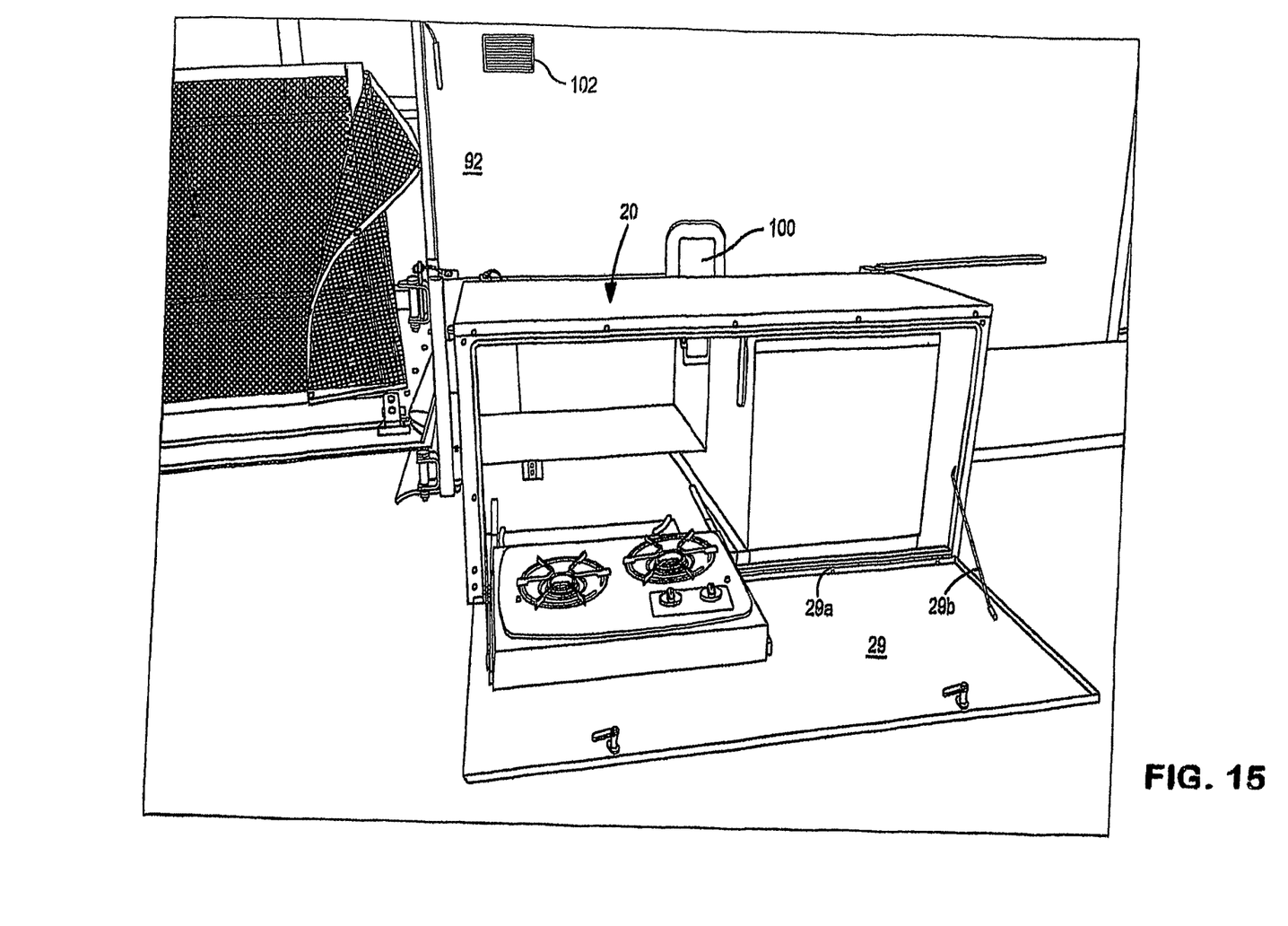
FIG. 15 is a front, left, upper perspective view of an alternative embodiment of the present invention, as positioned on the side wall of the RV.
Figure 16:
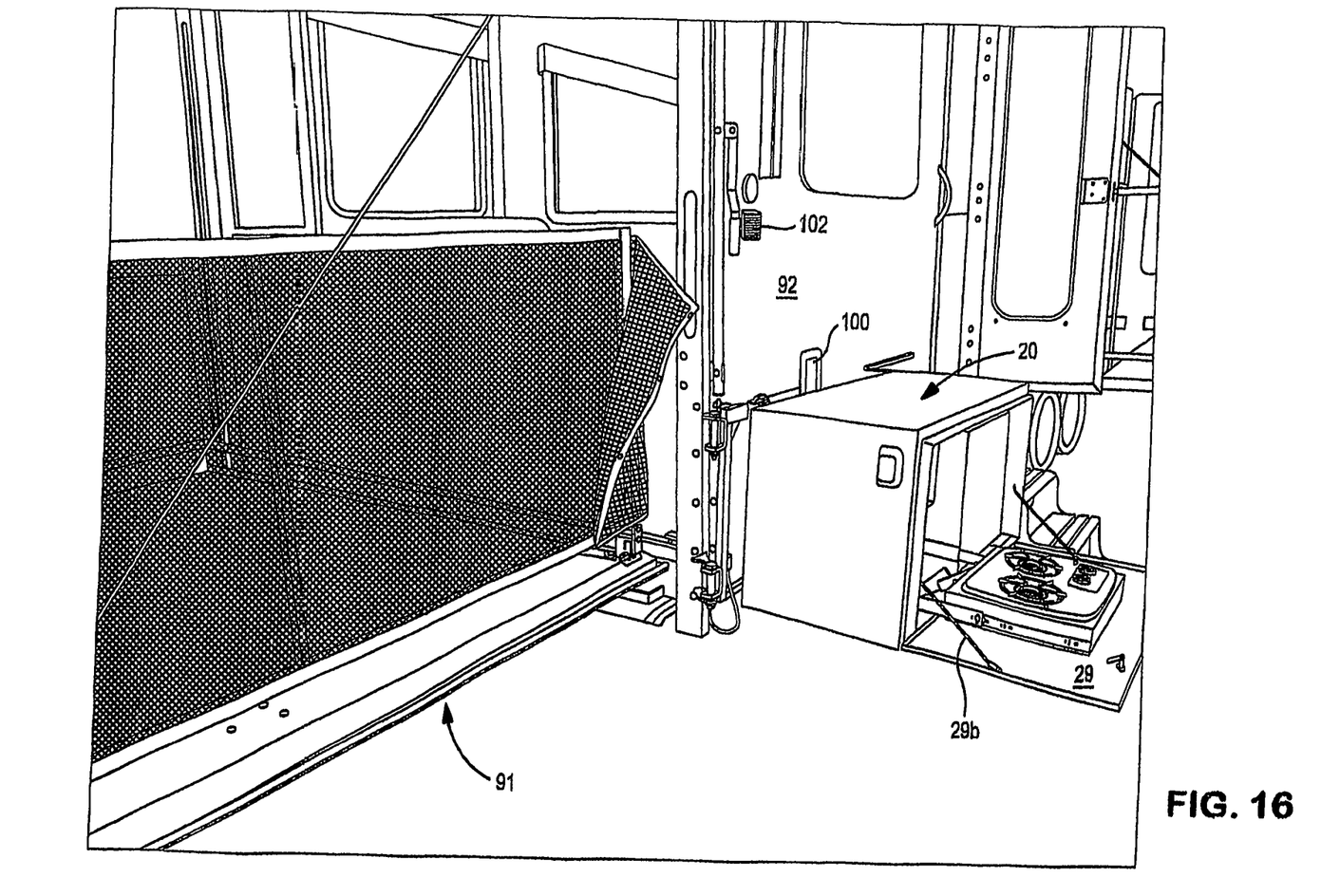
FIG. 16 is a left, upper perspective view of the embodiment of FIG. 15 in the position of FIG. 15.

FIG. 6 shows kitchen facilities 10 with door 29 in the open position and cooking unit 40 extended on slide mechanism 41. FIGS. 7 and 8 illustrate kitchen facilities 10 with storage unit 20 rotated about pivot location PL1 such that rear side 22 is generally parallel with sidewall 92 of recreational vehicle 90. FIGS. 9 and 10 show kitchen facilities 10 with storage unite 20 rotated about first pivot location PL1 such that third side 23 is generally parallel with sidewall 92 of recreational vehicle 90. FIGS. 11 and 12 show storage unit 20 rotating about both pivot locations PL1 and PL2 such that it can be positioned such that rear side 22 is generally parallel with sidewall 92 of recreational vehicle 90, as shown in FIGS. 13 and 14.

FIGS. 15-18 show another preferred embodiment of the present invention, differing from the previously described embodiment in certain features. Accordingly corresponding numbers are used in the figures between the two embodiments, where appropriate. In FIGS. 15-18, storage unit 20 is, for example, formed from powder coated metal into a generally rectangular container which is accessible through door 29. A hinge, 29*a* attaches door 29 to storage unit 20 in a conventional manner, and conventional stops 92*b* are used to limit the downward motion of door 29 to a generally horizontal plane. Thus, door 29 can serve as a counter space or working area for food preparation and the like when it is opened. Storage unit 20 is formed without wall 28 in this embodiment, allowing top 26 to function as a counter space or working area without peripheral limitations. In general, door 29 is formed in a vertical plane, but that vertical plane changes location and orientation as storage unit 20 is moved about the pivot location(s) of then mounting structure. Alternative mounting structures are within the scope of the present invention, having two or more pivot locations or one pivot location on a sliding channel, as described further herein. However, the common feature of these mounting structures, and one of its important functions is to allow the vertical plane of door 29 to be oriented for the door to freely open regardless of whether the storage unit is on the rear of the vehicle or the side of the vehicle, and without having to remove the storage unit from the vehicle. Thus, the user is not required to lift the storage unit to position it around the vehicle.

Figure 17:
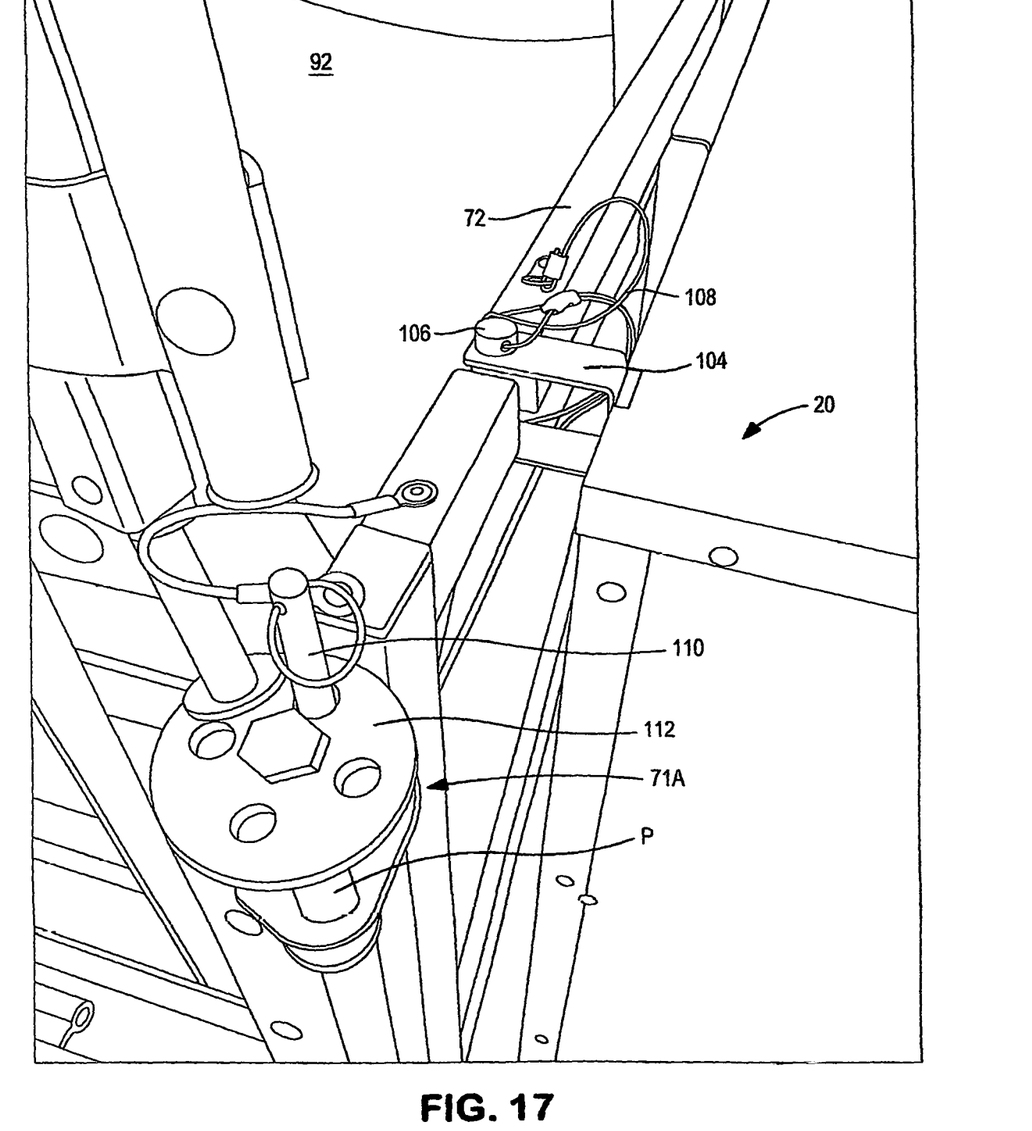
FIG. 17 is an enlarged, left, upper perspective view of the embodiment of FIG. 15 at the area of the position locking mechanisms.
Figure 18:
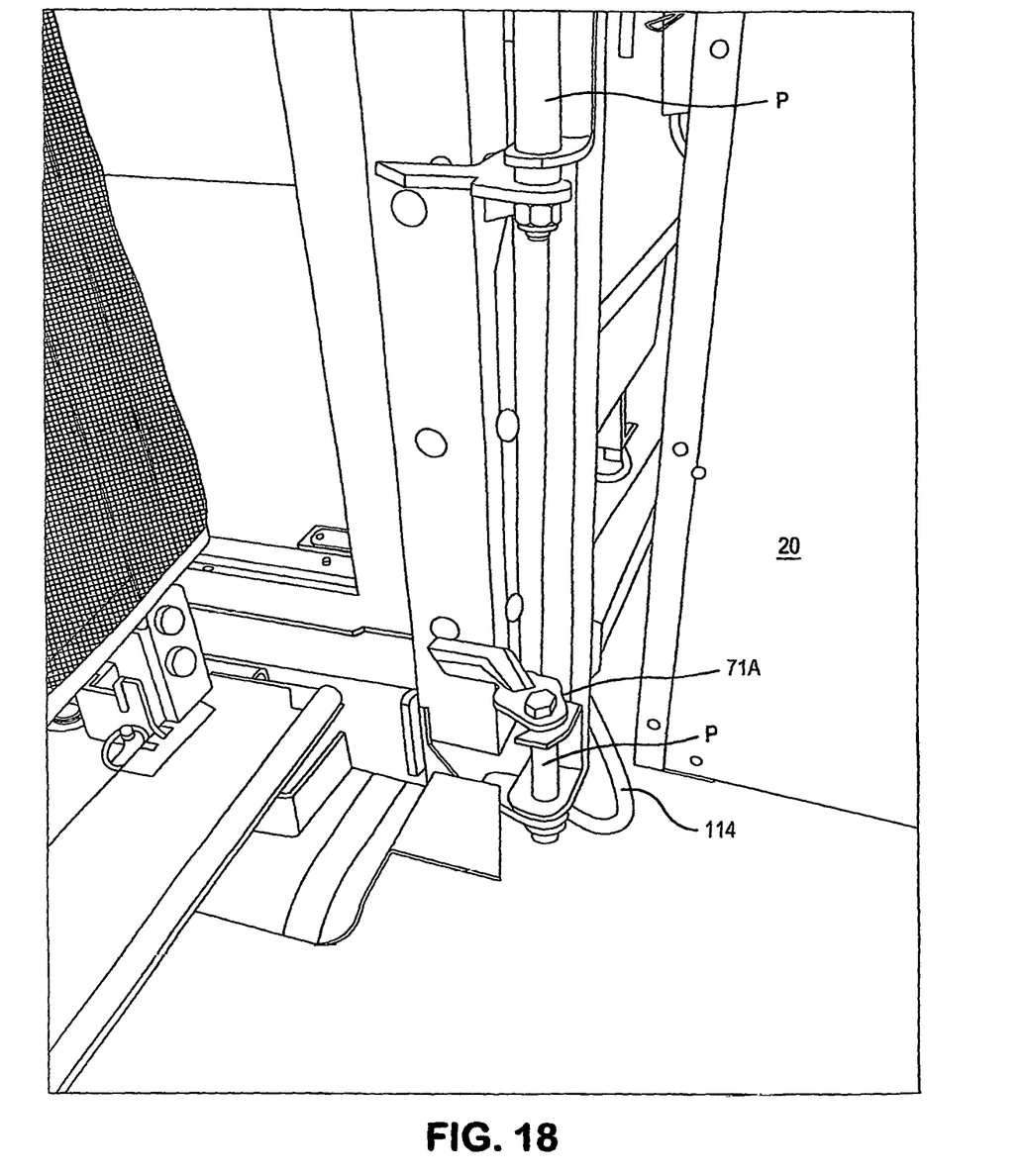
FIG. 18 is an enlarged, left, upper perspective view of the embodiment of FIG. 15 at the area of the DC electrical connection to the RV.

Also shown in connection with FIGS. 15-18 are side bumper 100, which is placed on sidewall 92 so as to protect the sidewall from inadvertent impact with storage unit 20, and electrical outlets 102 to allow electric power to appliances stored within storage unit 20. In FIG. 17, storage unit 20 is formed with a bracket 104 which is received by horizontally extending member 72 when storage unit 20 is to be held immobile with respect to member 72, and locking pin 106 is used to then secure member 72 to bracket 104. Locking pin, is, for example, formed as a conventional cylindrical pin passing through member 72 and bracket 104, and tethered to member 72 by wire 108. Similarly, a conventional pin 110 and slot 112 locking arrangement can be formed with respect to brackets 71A and pins P to selectively secure storage unit 20 into pre-set rotational positions about pins P. Alternatively, various conventional locking structures, such a ratchet and pawl, or the like can be used to selectively control the rotation of storage unit 20 about its rotational axis or axes. In FIG. 18, wiring 114 for DC electric power to storage unit 20 and/or its contents is provide through, for example, the second, lower horizontally extending member, and into the corner of rear wall 91 and sidewall 92. Such DC power, could, for example, be used to provide LED lighting in connection with the storage unit, using conventional LED elements.

Figure 20A:
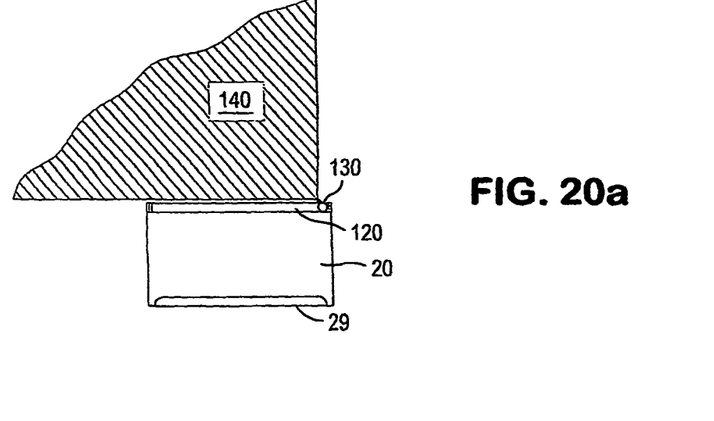
Figure 20B:
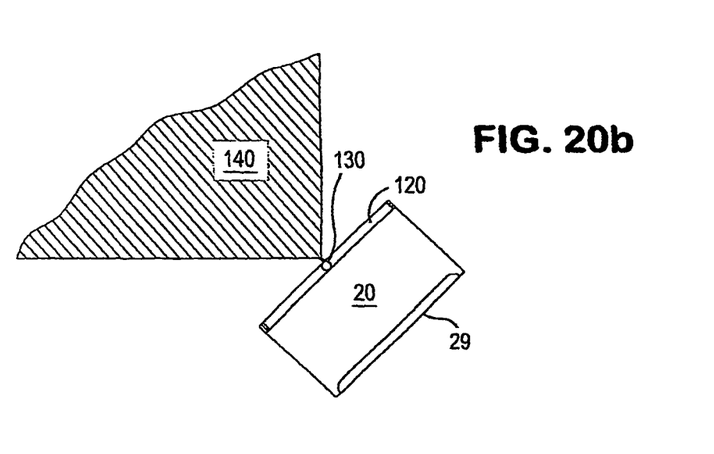
Figure 20C:
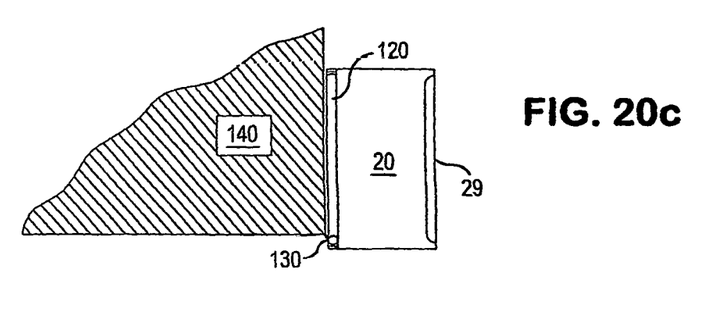

In these embodiments, the present invention is characterized by having a corner pivot structure for the storage box which extends outward away from the plane of the vehicle walls at either the side or the rear of the vehicle. Thus, the storage unit is able to pivot through an arc of approximately 270 degrees (in the horizontal plane, in the illustrated embodiment). The second pivot location allows storage unit 20 to additionally pivot through an arc of approximately 180 degrees (in the horizontal plane, in the illustrated embodiment). Thus, door 29 remains accessible regardless of which side of the vehicle the storage unit is being used on, and regardless of which direction of orientation is desired for that door, front, back, left or right opening. Stated differently, the mounting structure shown allows the vertical plane of door 29 to be rotated through an arc of approximately 360 degrees, even though any single pivot location used in the structure has a smaller arc of motion. However, the present invention is not limited merely to mounting structures having two pivot points or hinges and pivot points. For example, FIGS. 20(*a*) show another embodiment of the present invention wherein storage box 20 is formed with at least one C-channel 120 on its rear side, which receives therein a pivot pin 130, mounted to extend from the corner of a vehicle 140. Working in cooperation, pivot pin 130 allows storage unit 20 to slide along C-channel 120 through an arch of 270 degrees, keeping door 29 fully accessible at all times. It is also possible to achieve the desired motion of the present invention with a mounting structure having three or more pivot points, arranged for example, to allow a more compact collapsed structure when the storage unit is positioned adjacent a vehicle wall. In each case, the storage unit can maintain door accessibility as it is moved, without lifting, between two substantially orthogonal walls of a vehicle.

Figure 19A:
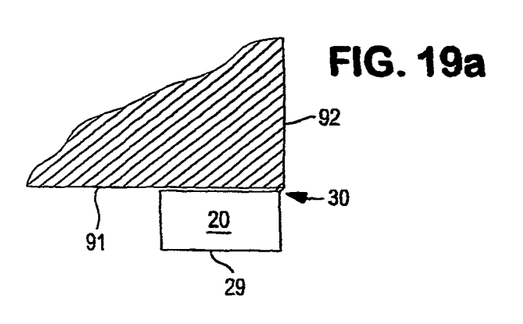
Figure 19B:
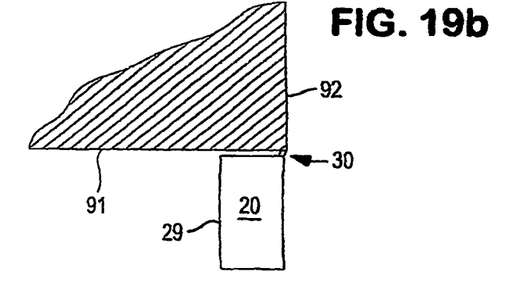
Figure 19C:
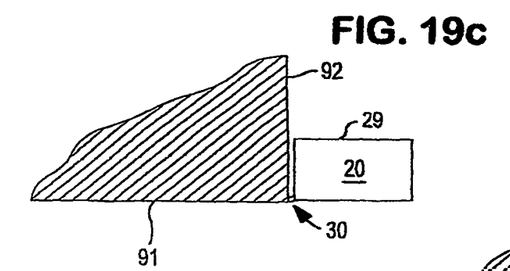
Figure 19D:
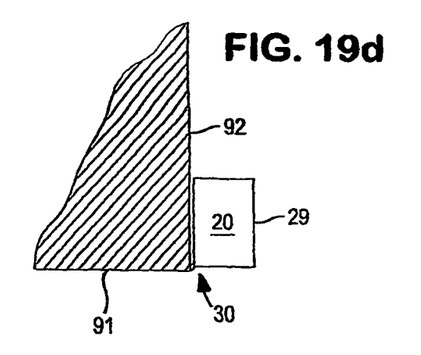
Figure 19E:
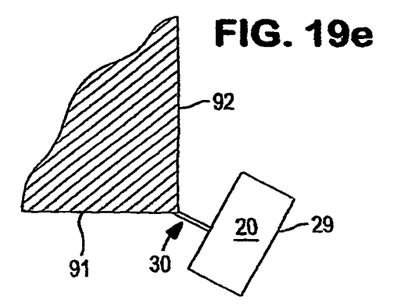

Further adaptations of the present invention include adding a conventional lift assist device (motor driven, pneumatic strut, or spring assist) to allow the storage unit to slide up and down the rotational axis of pivot location PL1. In this way, the storage unit can be rotated not just to toward the left side wall, but also to the opposite or right side wall of the trailer and, in the elevated position, door 29 would be immediately accessible to users of a conventional ramp door patio on the RV, as shown in FIG. 19*b*.

Figure 19F:
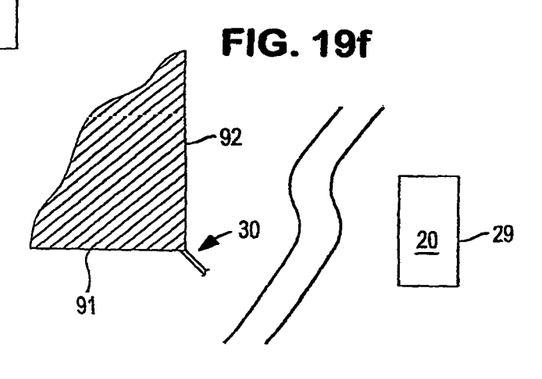

Also, in further embodiments, storage unit 20 can be formed to be readily removable from pins P, such that the storage unit can be lifted off of the vehicle and used at a remote location, as shown in FIG. 19*f*.

The storage unit of the present invention has been described and illustrated in part in connection with kitchen facilities, but is also suitable for use with entertainment systems, tools, special equipment, and a variety of other exterior devices which the user may find to be desirable to store on the exterior of a vehicle, such as an RV. For example, if a portable generator was mounted within storage unit 20, that arrangement could provide a number of significant advantages, compared with conventional internal RV generator mounting. Also, another advantage of the present arrangement is that the storage unit's location at the rear of the RV, especially in connection with toy hauler types of RVs, can provide a measure of additional security against ramp door intrusion, without loss of towing functionality.

Although the present invention has been described and illustrated above in connection with certain embodiments, that is by way of illustration and example only. It will now be readily apparent that numerous adaptations and modifications of the present invention are contemplated. Accordingly, the spirit and scope of the present invention are limited only by the terms of the following claims.

What is claimed is:

1. A recreational vehicle comprising:
   a first exterior wall and a second exterior wall,
   a container having first and second opposing walls, the first opposing wall including an opening for container access, and
   a connection assembly for allowing the container to be moved, while remaining attached to the vehicle, between:
   a first position where the second opposing wall of the container is adjacent the first exterior wall of the vehicle, and
   a second position where the second opposing wall of the container is adjacent the second exterior wall of the vehicle.

2. The recreational vehicle according to claim 1 wherein the connection assembly includes a rotatable connection to the vehicle, which allows the second opposing wall to pivot away from an exterior wall of the vehicle.

3. The recreational vehicle according to claim 2 where the connection assembly includes a pin and slot structure for retaining the container in pre-set pivotal positions with respect to the vehicle.

4. The recreational vehicle according to claim 2 wherein the connection assembly includes a rotatable connection to the container, which allows the container to pivot with respect to the connection assembly.

5. The recreational vehicle according to claim 1 wherein:
   the first exterior wall of the vehicle is the rear wall of the vehicle,
   the second exterior wall of the vehicle is a side wall of the vehicle connected to the rear wall of the vehicle, forming a corner area therebetween,
   the connection assembly is joined to the vehicle adjacent that corner area of those rear and side walls of the vehicle.

6. The recreational vehicle according to claim 1 wherein the container, includes exterior kitchen components, and has energy transfer means between the vehicle and those kitchen components.

7. The recreational vehicle according to claim 1 wherein the connection assembly allows the container to be separated from attachment from the vehicle for use at a location remote from the vehicle and then reattached to the vehicle.

* * * * *